Figure 1:
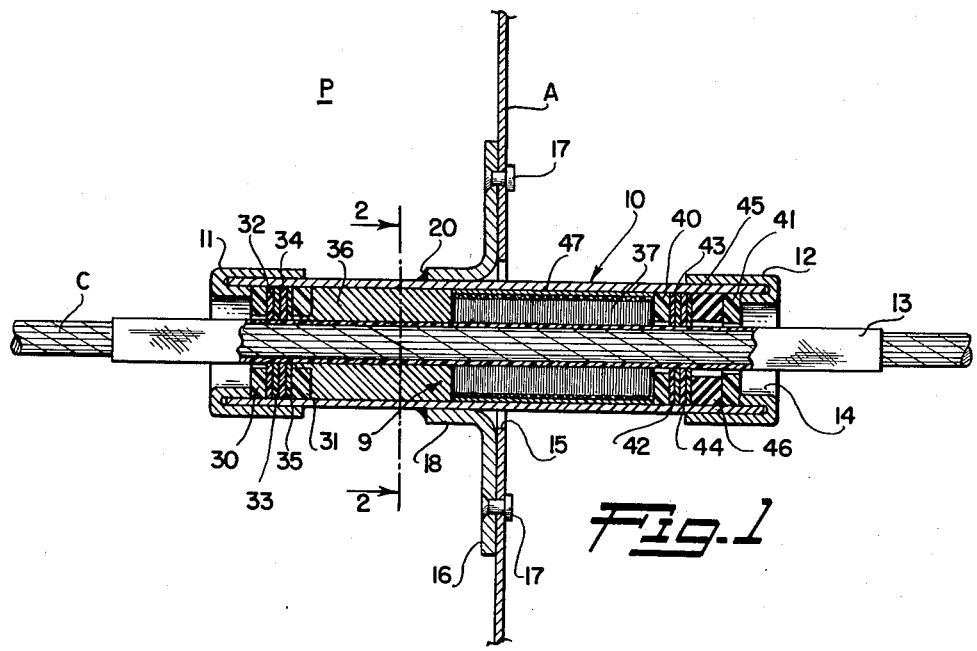

Dec. 19, 1961   R. C. WILSON   3,013,824
CABLE SEAL
Filed April 7, 1958

INVENTOR.
RONALD C. WILSON
BY
George C. Sullivan
Agent

3,013,824
CABLE SEAL
Ronald C. Wilson, Granada Hills, Calif., assignor to Lockheed Aircraft Corporation, Burbank, Calif.
Filed Apr. 7, 1958, Ser. No. 726,799
5 Claims. (Cl. 286—16)

This invention relates to sealing devices, and relates more particularly to devices for sealing about control cables and other movable control elements where they pass through pressure bulkheads, and the like.

In aircraft designed for high altitude flying it is now the common practice to pressurize the fuselage so that an internal air pressure condition may be maintained which is conducive to the comfort and well being of the passengers and crew. The control systems of aircraft usually embody cables which extend from the interior of the fuselage or flight compartment to the control elements. These cables pass through openings in the pressure bulkhead, and means must be provided to prevent the escape of the cabin air pressure from around the cables. It is important that an effective seal be maintained at each cable under the widely varying temperature conditions encountered during high altitude flight. Furthermore, it is important that the frictional resistance to cable movement offered by the sealing devices be kept at a minimum under all conditions of operation and flight so that the pilot has a full sense of "feel" in operating the controls.

The current practice of sealing cables is done by threading the cable through a relatively thick, solid material, with the clearance hole as small as possible. The present invention provides a seal which employs the reverse process; that is, the cable is allowed to pass through a large opening in which is placed a soft, flexible medium capable of sealing the cable completely. Generally, the cable is placed in a medium of densely stacked bristles in contact with the cable. The bristles are suitably retained in a cylindrical housing and the housing is packed with a suitable sealing compound.

It is a general object of this invention to provide a cable seal useful at a pressure bulkhead, or the like, that reduces air leakage to a minimum and that has low frictional resistance to cable movement. The cable seal of this invention keeps the air pressure leakage at an acceptable minimum when initially installed, as well as after extended service and while under a considerable pressure differential.

Another object of this invention is to provide a cable seal that is simple and compact, requiring a minimum of space at the bulkhead. The small compact sealing device of the invention does not interfere with the installation of pulleys in adjacent relation to the bulkhead or with the operation of cables over pulleys so positioned.

It is a further object of the present invention to provide a cable seal arrangement which has a seal opening or run-through for a cable which is as large as possible and yet which will prevent pressure leakage.

Figure 2:
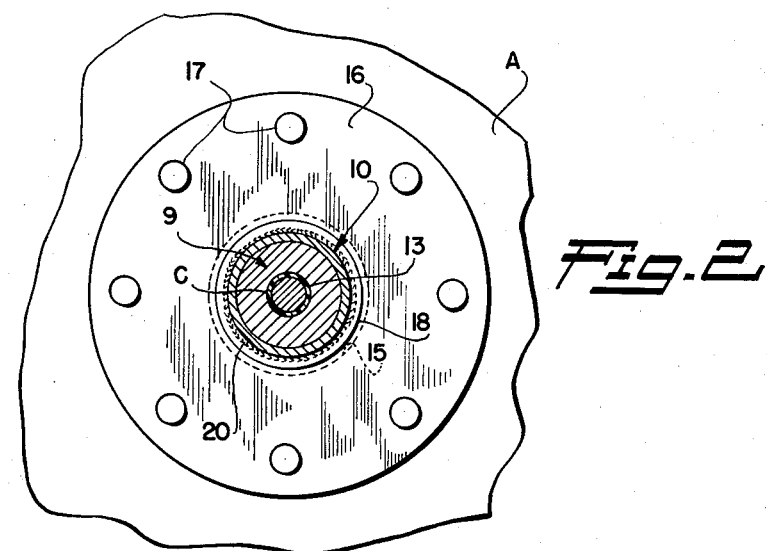

Other objects and features of the invention will be readily understood from the following detailed description of a typical preferred form of the invention wherein reference will be made to the accompanying drawings in which FIGURE 1 is a longitudinal cross sectional view of a cable seal of the invention in the operative position on a bulkhead; and FIGURE 2 is a cross sectional view of the cable seal of FIGURE 1 taken in the direction of arrows 2—2.

The sealing device of the present invention is capable of considerable variation for adaption for specific installations. Furthermore, the device may be constructed to seal about single cables or control element or a plurality of such members. In the following detailed description, a typical preferred form of the invention as employed to seal about conventional control cables will be described, it being understood that the invention is not to be construed as limited or restricted to the particular details herein set forth.

In the drawings, the sealing device is adapted to be installed on a bulkhead A to seal about a single cable C and the device may be said to comprise generally, a cylindrical body 10 having end retainers 11 and 12 which are suitably crimped or formed about the opposite ends of the body 10 to hold a sealing means 9 within the body for sealing about the cable C. The cable may be employed without a covering or as shown in the drawings a covering 13 is provided which presents a smooth cylindrical plastic surface. In the present instance, a tetrafluorethylene material has been found satisfactory.

The body 10 is a one-piece tubular metal member having a longitudinal cavity 14 which is considerably larger in diameter than the cable C so that the cable may pass through the body without interference. The body is of sufficient length to extend through an opening 15 in the bulkhead A and then project some distance from the inner or "pressure" side P of the bulkhead. The body 10 is retained within opening 15 and is secured to bulkhead A by means of an annular flange 16 which is fastened to the bulkhead by means of rivets 17. Flange 16 is provided with a collar 18 which surrounds the body 10 and is secured thereto by suitable means such as welds 20.

The sealing or packing means 9 is contained within body 10 and comprises, from the left hand side of FIGURE 1, a first pair of Teflon washers 30 and 31 separated by an arrangement of Orlon washers 32–35 inclusive, a sealant 36, a multiplicity of Nylon bristles 37 impregnated with sealant, and a second pair of Teflon washers 40 and 41 separated by another arrangement of Orlon washers 42–45 inclusive and a rubber washer 46. The Teflon washers 30, 31 and 40, 41 are employed as anti-friction washers in the event the cable is momentarily displaced. The inside diameter of each Teflon washer is intentionally made larger than the outside diameter of the cable including covering 13 so that a slight clearance is provided which prevents rubbing of the cable against the Teflon washers during normal operation of the cable. The Teflon washers are arranged in pairs to hold the multiplicity of Orlon washers in position. The Orlon washers are provided with an inside diameter which is engageable with the covering 13 of the cable C and are used in combination with the Teflon covering to reduce friction wear as the cable is displaced through the seal. The Orlon washers are particularly useful in this application since the Orlon composition offers qualities of non-fraying which is normally encountered when washers of fiber composition are employed.

The sealant 36 is employed to substantially prevent air from passing through body 10 and in the present instance, it has been found desirable to employ a grease composition as the sealant. It is to be understood that although grease affords certain lubricating qualities, the sealing device of the present invention does not require any type of lubricant and the grease employed is solely for purposes of a sealant.

Located adjacent the sealant 36 and Teflon washer 40, there is provided a plurality of Nylon bristles represented by the general reference number 37 which are impregnated with the grease sealant 36. The extreme free ends of the bristles are in direct contact with the covering 13 and the bristles are preferably composed of Nylon which cooperates with the Teflon covering 13 to reduce frictional wear between the parts while the cable is moving. For the convenience of installation and for maintaining Teflon washers 31 and 40 in position, an annular steel sleeve 47 is provided into which the impregnated Nylon bristles may be inserted so that the sleeve may be conveniently slipped into cavity 14 during initial installation. The sealant 36 and the sleeve 47 cooperate to maintain Teflon washers 31 and 40 in their respective positions.

The rubber washer 46 is employed to seal the inside diameter of body 10 and acts as a retainer in conjunction with Teflon washers 40 and 41 to retain Orlon washers 42–45 inclusive. Inasmuch as washer 46 is of resilient composition, substantially the left-hand side of the sealing or packing means 9 acts in a manner somewhat similar to a piston. Thereby, the sealing or packing means 9 represents a combined static and dynamic sealing means for preventing the exchange of air between compartments separated by bulkhead A even though the pressure differential between the compartments is substantial.

From the above detailed description, it is believed that it will be apparent how the cable seal may be employed at the bulkhead A to maintain airtight sealing around cables. The air pressure at the inner side P of the bulkhead A holds the packing 9 in sealing engagement with the periphery of the cable cover 13 to prevent leakage around the exterior of the cable. The sealing means of the present invention offers a minimum of resistance to the movement of the cable and is not susceptible to leakage under varying pressure and temperature conditions.

Having described only a typical form of the invention, I do not wish to be limited to specific details herein set forth, but wish to reserve to myself any variations or modifications that may appear to those skilled in the art or fall within the scope of the following claims:

I claim:
1. A device for sealing comprising a body of rigid material having a longitudinal cavity, a multiplicity of sealing bristles secured in the cavity, a supply of sealant stored adjacent the bristles within the cavity and impregnating the bristles to prevent the passage of air through the cavity, and retainers fixed on the opposite ends of the body for retaining the stored sealant and bristles within the cavity under slight pressure to insure constant impregnation of the bristles with sealant.

2. A device for sealing about a member comprising a body of rigid material having a longitudinal cavity for receiving the member, a multiplicity of sealing bristles secured in the cavity about the member, a supply of flowable sealant stored adjacent the bristles within the cavity and impregnating the bristles to prevent the passage of air through the cavity, a plurality of soft, pliable washers arranged within the cavity to enclose the sealant and the bristles in cooperation with the body, and retaining caps fixed on the opposite ends of the body and extending into the cavity to engage the plurality of washers for retaining the sealant and bristles within the cavity and under slight pressure to insure constant impregnation of the bristles with sealant in contact with the periphery of the member.

3. The invention as defined in claim 2 wherein, selected washers have inside diameters substantially larger than the outside diameter of the member to provide a clearance therebetween, and wherein other selected washers have inside diameters in communication with the periphery of the member.

4. A device for sealing comprising a body of rigid material having a longitudinal cavity, a multiplicity of sealing bristles disposed in the cavity, a sealant disposed adjacent the bristles within the cavity and impregnating the bristles for sealing the cavity, a first group of washers disposed within the cavity adjacent the sealant, a second group of washers disposed within the cavity adjacent the bristles, the first and second groups of washers arranged to enclose the sealant and bristles within the cavity, and retaining caps fixed on the opposite ends of the body engageable with the first and second group of washers for retaining the sealant and bristles within the cavity.

5. The invention as defined in claim 4 wherein the second group of washers includes at least one washer of resilient composition, which is yieldable under pressure to permit longitudinal movement of the first group of washers, the sealant and the bristles within the cavity.

References Cited in the file of this patent

UNITED STATES PATENTS

| | | |
|---|---|---|
| 1,109,826 | Doble | Sept. 8, 1914 |
| 2,390,928 | Del Mar et al. | Dec. 11, 1945 |
| 2,517,693 | Mead et al. | Aug. 8, 1950 |
| 2,845,286 | Case et al. | July 29, 1958 |

FOREIGN PATENTS

| | | |
|---|---|---|
| 702,862 | Germany | Jan. 23, 1941 |